(12) United States Patent
Kang et al.

(10) Patent No.: US 10,157,075 B2
(45) Date of Patent: Dec. 18, 2018

(54) DEVICE FOR DISTRIBUTING LOAD AND MANAGING POWER OF VIRTUAL SERVER CLUSTER AND METHOD THEREOF

(71) Applicant: Electronics and Telecommunications Research Institute, Daejeon (KR)

(72) Inventors: Dong Oh Kang, Daejeon (KR); Chang Seok Bae, Daejeon (KR); Joon Young Jung, Daejeon (KR); Jang Ho Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 166 days.

(21) Appl. No.: 15/197,016

(22) Filed: Jun. 29, 2016

(65) Prior Publication Data
US 2017/0102757 A1 Apr. 13, 2017

(30) Foreign Application Priority Data
Oct. 7, 2015 (KR) .................... 10-2015-0141075

(51) Int. Cl.
*H04L 12/26* (2006.01)
*G06F 9/455* (2018.01)
(Continued)

(52) U.S. Cl.
CPC .......... *G06F 9/45558* (2013.01); *G06F 1/189* (2013.01); *G06F 1/3206* (2013.01);
(Continued)

(58) Field of Classification Search
CPC ....... H04L 41/0896; H04L 43/08; G06F 9/50; G06F 1/189; G06F 1/3206; G06F 2009/45575
(Continued)

(56) References Cited

U.S. PATENT DOCUMENTS 6,964,539 B2 11/2005 Bradley et al.
8,041,970 B2 10/2011 Oh et al.
(Continued)

FOREIGN PATENT DOCUMENTS

| KR | 10-0560283 B1 | 3/2006 |
| KR | 10-2009-0062107 A | 6/2009 |
| KR | 10-2011-0097842 A | 8/2011 |

*Primary Examiner* — Chris Parry
*Assistant Examiner* — Weiwei Y Stiltner
(74) *Attorney, Agent, or Firm* — Nelson Mullins Riley & Scarborough LLP; Anthony A. Laurentano

(57) ABSTRACT

A device for distributing a load and managing power of a virtual server cluster includes a monitoring unit configured to monitor a load distribution condition on server nodes included in a server cluster and a dynamic state of each of the server nodes, a server node information storage unit configured to store static state information of each of the server nodes, a policy determination unit configured to determine a load distribution policy and a power management policy for each of the server nodes using monitoring information and the static state information stored in the server node information storage unit, and a controller configured to control conversion of each of the server nodes into an active state or an inactive state according to the power management policy, and distribution of a load of a service request requested by a service client to activated server nodes according to the load distribution policy.

16 Claims, 6 Drawing Sheets

(51) Int. Cl.
   *G06F 1/18* (2006.01)
   *G06F 1/32* (2006.01)
   *G06F 9/50* (2006.01)
   *H04L 12/24* (2006.01)
(52) U.S. Cl.
   CPC ............ *G06F 9/50* (2013.01); *H04L 41/0893* (2013.01); *H04L 41/0896* (2013.01); *H04L 43/08* (2013.01); *G06F 2009/45575* (2013.01)
(58) Field of Classification Search
   USPC .......................................................... 709/224
   See application file for complete search history.

(56) References Cited

U.S. PATENT DOCUMENTS

| | | |
|---|---|---|
| 9,043,624 B2 | 5/2015 | Gao et al. |
| 9,250,680 B2 | 2/2016 | Gao et al. |
| 2002/0194335 A1* | 12/2002 | Maynard ................ G06F 9/505 709/225 |
| 2010/0185766 A1* | 7/2010 | Sano ..................... G06F 1/3203 709/226 |
| 2011/0138195 A1 | 6/2011 | Kim et al. |
| 2011/0213997 A1 | 9/2011 | Kansal et al. |
| 2011/0231860 A1* | 9/2011 | Kazama ................ G06F 9/5094 718/105 |
| 2012/0016933 A1* | 1/2012 | Day ..................... H04L 63/102 709/203 |
| 2014/0192653 A1 | 7/2014 | Jung et al. |
| 2014/0280866 A1* | 9/2014 | Lyon ................... H04L 67/1008 709/224 |
| 2015/0074222 A1* | 3/2015 | Liang .................. H04L 67/2842 709/214 |
| 2015/0363238 A1* | 12/2015 | Bai ....................... G06F 9/5022 718/1 |
| 2016/0116966 A1 | 4/2016 | Gao et al. |
| 2016/0143076 A1* | 5/2016 | Razavi .................. H04L 67/101 370/329 |
| 2016/0179494 A1* | 6/2016 | Pavlov ..................... G06F 8/61 717/177 |

\* cited by examiner

DEVICE FOR DISTRIBUTING LOAD AND MANAGING POWER OF VIRTUAL SERVER CLUSTER AND METHOD THEREOF

CROSS-REFERENCE TO RELATED APPLICATION

This application claims priority to and the benefit of Korean Patent Application No. 10-2015-0141075, filed on Oct. 7, 2015, the disclosure of which is incorporated herein by reference in its entirety.

BACKGROUND

1. Field of the Invention

The present invention relates to a device for distributing a load and managing power of a server cluster and a method thereof, and more particularly, to a device for distributing a load and managing power of a virtual server cluster for cloud computing using a virtualized server as a service server, and a method thereof.

2. Discussion of Related Art

A server cluster system is a system which distributes a service request requested from the outside to servers in a server cluster through a load distributor by connecting a plurality of servers providing a specific service to one load distributor or a plurality of load distributors and processing the service request. Because the server cluster system sequentially distributes and allocates the service request to the servers of a cluster and allows the servers to process the service request, a satisfactory response result is induced when there is a service request load which is equal to or more than a processing capacity of a single server.

A method of distributing a load of a server cluster system is designed based on response performance with respect to the service request load, but is generally designed to be suitable for a maximum service request load. In this case, a server unnecessarily stands by in an active state with respect to a service request load which is smaller than the maximum service request load, or consumes power by operating at a small amount of resource usage. Accordingly, a method of distributing a load and managing power capable of obtaining a satisfactory response result with respect to the service request while decreasing the power by maintaining only an optimized server providing a service in an active state and converting the remaining servers into a low power state is needed.

A time-based scheduling method, which is a power management policy of a conventional server, is a method of scheduling a power state of each server node as a time unit. The method converts a server needed at a time period in which many servers are needed into the active state through an experience of a cluster manager, and performs a load distribution on the activated servers. The method cannot obtain a desired result in a situation different from the experience of the manager because it completely depends on the experience of the manager. Further, decreased power consumption and service performance are generally mutually incompatible because of a feature in which one is increased while the other is decreased, a more satisfactory design is difficult.

Accordingly, a system and method of distributing a load and managing power of a server cluster capable of obtaining a desired service response result and decreasing power consumption by recognizing a request condition and a service condition on a server while reflecting an experience of the manager, and performing a suitable load distribution and power management is required.

Meanwhile, recently, a cloud computing service using a virtualized server as a service server is being provided. Accordingly, a virtual machine (the virtualized server) should be considered for the load distribution and the power management. However, the conventional method has difficulty distributing a load and managing power consumption effectively due to a difference between a physical server and the virtual machine.

SUMMARY OF THE INVENTION

The present invention is directed to a device for distributing a load and managing power of a server cluster for cloud computing using a virtualized server as well as a physical server as a service server, and a method thereof.

According to one aspect of the present invention, there is provided a device distributing a load and managing power, including: a monitoring unit configured to monitor a load distribution condition on server nodes included in a server cluster and a dynamic state of each of the server nodes; a server node information storage unit configured to store static state information of each of the server nodes; a policy determination unit configured to determine a load distribution policy and a power management policy for each of the server nodes using information monitored by the monitoring unit and the static state information stored in the server node information storage unit; and a controller configured to control conversion of each of the server nodes into an active state or an inactive state according to the power management policy, and distribution of a load of a service request requested by a service client to activated server nodes according to the load distribution policy.

The monitoring unit may include: a load distributor monitoring unit configured to monitor a request connection state including at least one of connections per second (CPS) or the amount of packets for the load distributor connected to the server cluster; and a server node monitoring unit configured to monitor at least one dynamic state among the amount of resource usage, service information and provision state, and a power state of each of the server nodes.

The static state information may be additional information having a static information type including at least one among a vendor, a rated power consumption, physical rack information, and an installation location of each of the server nodes.

The policy determination unit may include: a load distribution policy determination unit configured to determine a static weight and a dynamic weight for each of the server nodes using the static state information and the dynamic state information; and a power management policy determination unit configured to determine a server node which is to be activated among the server nodes.

The load distribution policy determination unit may schedule at least one among a value of a proportional constant, a standard weight, and a standard amount of resource usage in units of time according to a manipulation of a user, and reflect the schedule in the load distribution policy.

The power management policy determination unit may determine a number of optimal active server nodes in proportion to the service request, and determine whether to convert the server nodes into the active state or the inactive state according to the number of optimal active server nodes.

The power management policy determination unit may manage an active server node table which sets and manages an order of priority of the server nodes which are activated, and an inactive server node table which sets and manages an order of priority of server nodes which are deactivated.

The power management policy determination unit may determine a policy so as to convert the server nodes into the active state in order of having a higher priority in the inactive server node table, and determine a policy so as to convert the server nodes into the inactive state in order of having a lower priority in the active server node table.

The controller may include: a load distributor controller configured to control the load distributor to consider a weight of each of the active server nodes so that the load of the service request is distributed to the active server nodes; and a power management controller configured to manage a power state of each of the server nodes to be the active state or the inactive state.

When a power state of a virtual machine among the server nodes is converted into the active state or the inactive state, the power management controller may convert the virtual machine into the active state after converting a physical machine, which is a host of the virtual machine, into the active state, and convert the physical machine into the inactive state after converting the virtual machine into the inactive state.

According to another aspect of the present invention, there is provided a method of distributing a load and managing power, including: monitoring a load distribution condition on server nodes included in a server cluster and a dynamic state of each of the server nodes; storing static state information of each of the server nodes; determining a load distribution policy and a power management policy for each of the server nodes using information monitored by the monitoring unit and the static state information stored in the server node information storage unit; and controlling conversion of each of server nodes into an active state or an inactive state according to the power management policy, and distribution of a load of a service request requested by a service client to activated server nodes according to the load distribution policy.

The monitoring of the load distribution condition on the server nodes included in the server cluster and the dynamic state of each of the server nodes, may include: monitoring a request connection state including at least one of connections per second (CPS) or the amount of packets for a load distributor connected to the server cluster; and monitoring at least one dynamic state among the amount of resource usage, service information and provision state, and a power state of each of the server nodes.

The static state information may be additional information having a static information type including at least one among a vendor, a rated power consumption, physical rack information, and an installation location of each of the server nodes.

The determining of the load distribution policy and the power management policy may include: determining a static weight and a dynamic weight for each of the server nodes using the static state information and the dynamic state information; and determining a server node which is to be activated among the server nodes.

The determining of the load distribution policy and the power management policy may schedule at least one among a value of a proportional constant, a standard weight, and a standard amount of resource usage in units of time according to a manipulation of a user, and reflect the schedule in the load distribution policy.

The determining of the load distribution policy and the power management policy may determine a number of optimal active server nodes in proportion to the service request, and determine whether to convert the server nodes into the active state or the inactive state according to the number of optimal active server nodes.

The determining of the load distribution policy and the power management policy may further include: managing an activation server node table which sets and manages an order of priority of the server nodes which are activated, and an inactive server node table which sets and manages an order of priority of server nodes which are deactivated.

The determining of the load distribution policy and the power management policy may determine a policy so as to convert the server nodes into the active state in order of having a higher priority in the inactive server node table, and determine a policy so as to convert the server nodes into the inactive state in order of having a lower priority in the active server node table.

The controlling of the conversion of each of the server nodes into the active state or the inactive state according to the power management policy, and the distribution of the load of the service request requested by the service client to the activated server nodes according to the load distribution policy, may include: controlling the load distributor to consider a weight of each of the active server nodes so that the load of the service request is distributed to the active server nodes; and managing a power state of each of the server nodes to be the active state or the inactive state.

When a power state of a virtual machine among the server nodes is converted into the active state or the inactive state, the virtual machine may be converted into the active state after converting a physical machine, which is a host of the virtual machine, into the active state, and the physical machine may be converted into the inactive state after converting the virtual machine into the inactive state.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
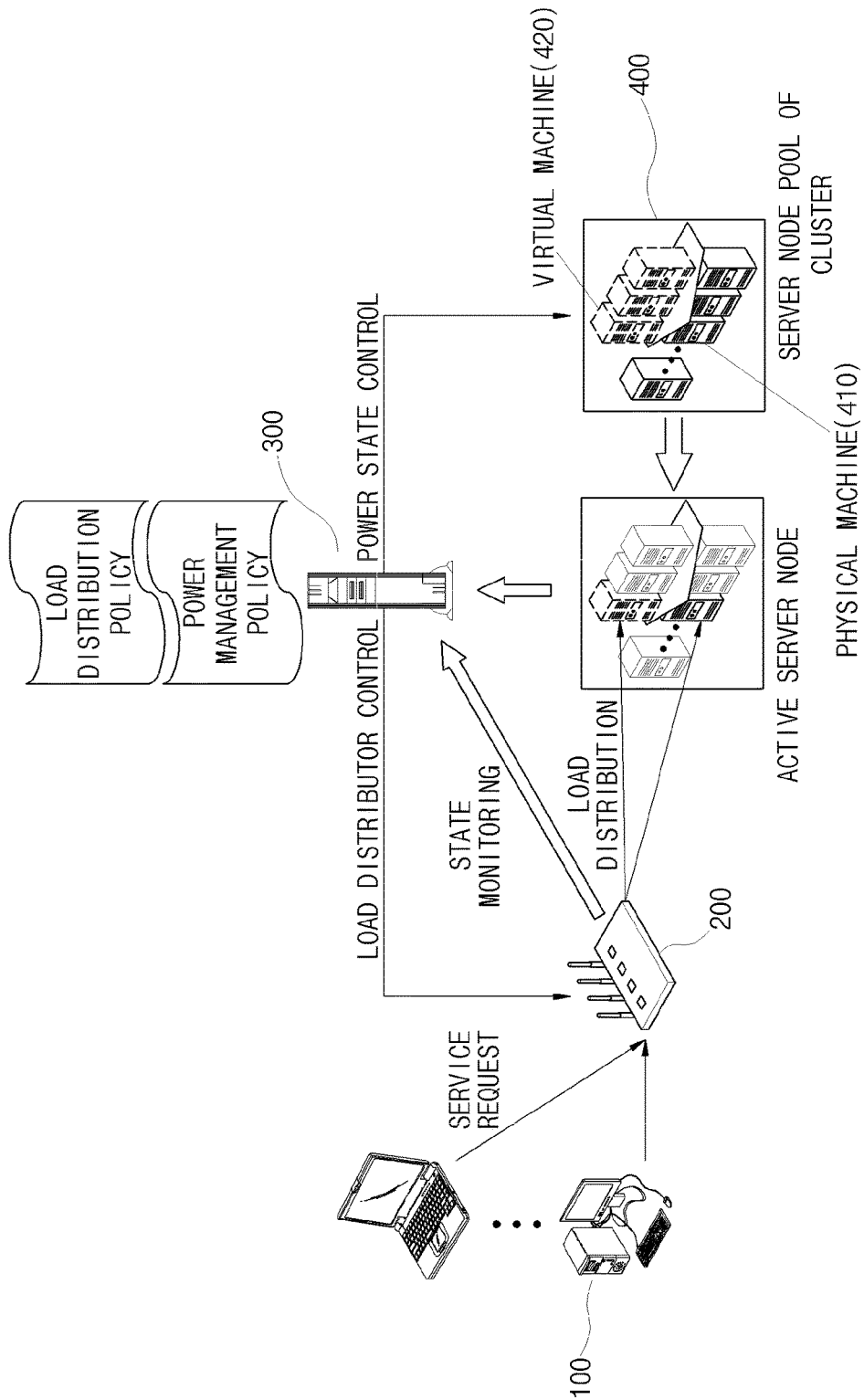
FIG. 1 is a block diagram illustrating an entire system including a device for distributing a load and managing power of a virtual server cluster according to an embodiment of the present invention.

The above and other objects, features and advantages of the present invention will become more apparent with reference to embodiments which will be described hereinafter with reference to the accompanying drawings. However, the present invention is not limited to embodiments which will be described hereinafter, and can be implemented as various different types. The embodiments of the present invention are described below in sufficient detail to enable those of ordinary skill in the art to embody and practice the present invention. The present invention is defined by its claims. Meanwhile, the terminology used herein to describe embodiments of the invention is not intended to limit the scope of the invention. The articles "a," "an," and "the" are singular in that they have a single referent, but the use of the singular form in the present document does not preclude the presence of more than one referent. It should be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Hereinafter, embodiments of the present invention will be described with reference to accompanying drawings. When adding reference numerals to components of each drawing, the same reference numeral is added even when being shown in another drawing with respect to the same component, and when it is determined that a detailed description of a well-known technology related to the present invention can unnecessarily obscure the subject matter of the present invention, the description will be omitted.

FIG. 1 is a block diagram illustrating an entire system including a device for distributing a load and managing power of a virtual server cluster according to an embodiment of the present invention.

As shown in FIG. 1, an entire system including a device for distributing a load and managing power of a virtual server cluster according to an embodiment of the present invention may include a service client 100, a load distributor 200, a load distribution/power management device 300, and a server cluster 400. Here, each of the service client 100, the load distributor 200, and the load distribution/power management device 300 may be configured as one or more devices. Further, each of the load distributor 200 and the load distribution/power management device 300 may be implemented as a separate machine, or may be integrally implemented in a single machine. Moreover, the server cluster 400 may be configured as a server node pool configured as a plurality of server nodes.

Each of the server nodes included in the server cluster 400 may be a server providing a service to an actual client, and may be one of an actual physical machine 410 and a virtual machine 420. That is, the server cluster 400 may include a plurality of physical machines 410 and a plurality of virtual machines 420. In this case, the virtual machine 420 may be implemented in the physical machine 410, and the physical machine 410 in which the virtual machine 420 is implemented may be referred to as a host machine. Further, the plurality of virtual machines 420 may be implemented in a single physical machine 410.

The service client 100 may be connected to the load distributor 200, and transmit a service request to a virtual server of the load distributor 200. In this case, the service client 100 and the load distributor 200 may be connected to each other through wired communication or wireless communication.

The load distributor 200 may perform a function of distributing a service request requested from the service client 100 to service nodes included in the server cluster 400. In this case, the load distributor 200 may individually distribute the service request load to each of the server nodes included in the server cluster 400 according to a load distribution algorithm.

The load distribution/power management device 300 may control a power state of the server nodes included in the server cluster 400 based on a power management policy and a load distribution policy. Further, the load distribution/power management device 300 may control the load distributor 200 so as to distribute the service request load by the service request of the service client 100 to the server nodes included in the server cluster 400.

Above components may be basic components of the server cluster system, and the server cluster system may include an additional component. For example, the server cluster system may include exclusive hardware for monitoring a state of the server cluster 400 or an additional device for controlling a power state.

Hereinafter, the load distribution/power management device 300 for load distribution and power management of the server cluster 400 according to an embodiment of the present will be described in detail with reference to FIG. 2.

Figure 2:
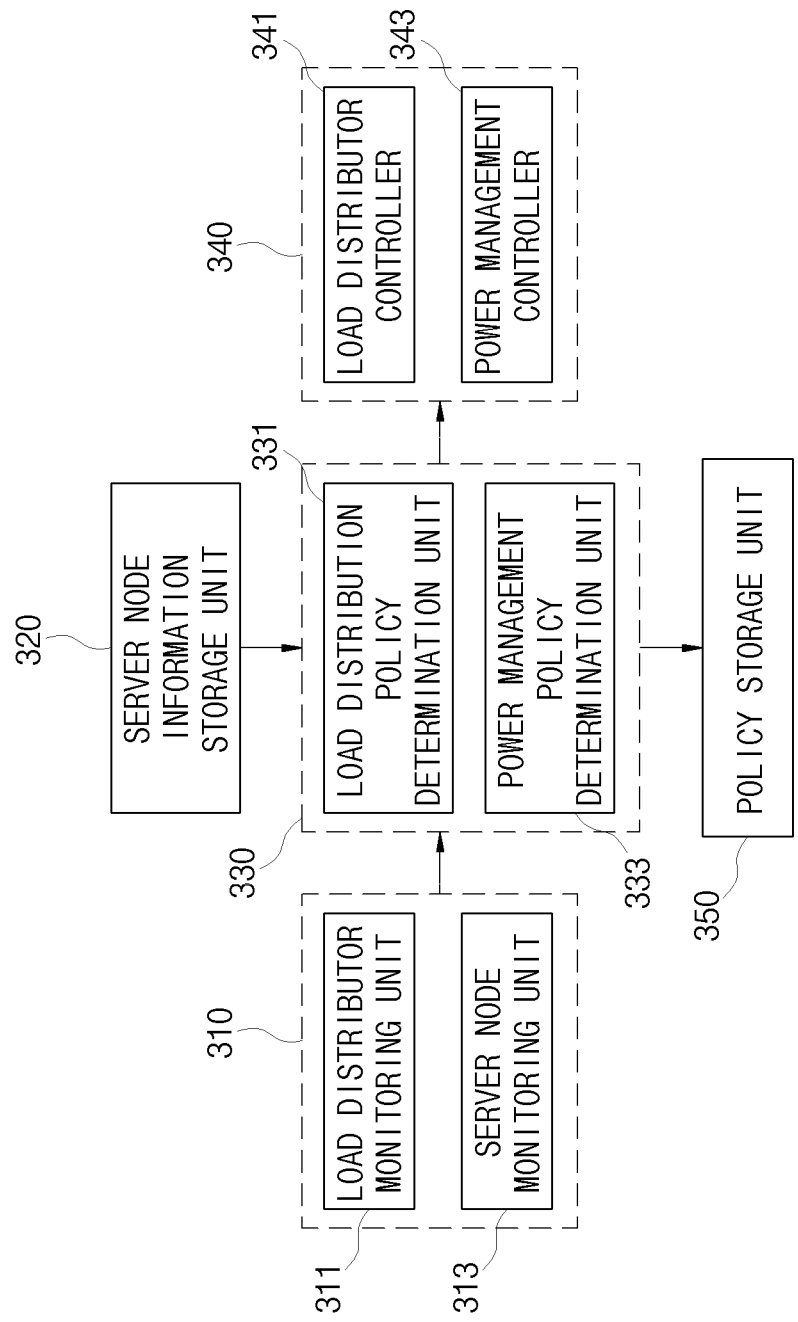
FIG. 2 is a diagram illustrating a configuration of a load distribution/power management device of a server cluster according to an embodiment of the present invention.

FIG. 2 is a diagram illustrating a configuration of a load distribution/power management device of a server cluster according to an embodiment of the present invention.

As shown in FIG. 2, the load distribution/power management device 300 may include a load distributor monitoring unit 311, a server node monitoring unit 313, a server node information storage unit 320, a load distribution policy determination unit 331, a power management policy determination unit 333, a load distributor controller 341, and a policy storage unit 350. In this case, every component may not be implemented in the load distribution/power management device 300, and a portion of the components may be implemented in a separate device, a server, or a module, etc. Hereinafter, the components will be described by assuming that the components are implemented in the load distribution/power management device 300.

First, a monitoring unit 310 including the load distributor monitoring unit 311 and the server node monitoring unit 313 will be described.

The load distributor monitoring unit 311 may recognize a load distribution condition of the load distributor 200 through communication with the load distributor 200. For example, the load distributor monitoring unit 311 may recognize a request connection state including connections per second (CPS) or the amount of packets, etc. with respect to a virtual server of the load distributor 200. Further, the load distributor monitoring unit 311 may monitor information on the server nodes of the server cluster 400 attached (connected) to and distributed by the virtual server of the load distributor 200.

The amount of service requests of the service client 100 may be calculated based on the monitored information, and the state of the load distributor 200 may be recognized. Load distributor monitoring information monitored by the load distributor monitoring unit 311 may be provided to the load distribution policy determination unit 331 and the power management policy determination unit 333, and be used for determining a load distribution policy and a power management policy.

The server node monitoring unit 313 may recognize the amount of resource usage, service information and provision state, and a power state of each of the server nodes included in the server cluster 400 which is being operated. For example, the server node monitoring unit 313 may recognize a central processing unit (CPU), a disk, the amount of network usage, or an operating power mode of each of the server nodes by communicating with each of the server nodes.

In this case, the communication with the server nodes may be performed using agent software (S/W) implemented in each of the server nodes. Further, the power state may be directly recognized from hardware (H/W) such as a baseboard management controller (BMC) board of each of the server nodes. For example, Apache Tomcat provides monitoring information of a web service.

Further, the server node monitoring unit 313 may recognize the power consumption of each of the server nodes. In this case, a server node having H/W measuring the power consumption may receive and recognize a measured value from the H/W of the server node through the communication. When the server node does not have H/W measuring the power consumption, the power consumption of the serve node may be calculated by S/W based on the amount of system resource usage such as the amount of CPU usage.

The server node monitoring unit 313 may provide the collected server node monitoring information on each of server nodes to the load distribution policy determination unit 331 and the power management policy determination unit 333, and the server node monitoring information may be used for determining the policy.

The load distributor monitoring information monitored by the load distributor monitoring unit 311 of the monitoring unit 310 may provide information on an external condition of the server cluster 400, and the server node monitoring information monitored by the server node monitoring unit 313 may provide information on an inside the server cluster 400. The load distribution policy and the power management policy for the server cluster 400 may be determined based on two pieces of the information (the load distributor monitoring information and the server node monitoring information) of the monitoring unit 310.

Meanwhile, the server node information storage unit 320 may store additional information having a static information type (static state information) on each of the server nodes included in the server cluster 400. For example, while the server node monitoring unit 313 monitors and stores information of each of the server nodes which is dynamically changed, the server node information storage unit 320 may store additional information having the static information type such as a vendor or rated power consumption, etc of each of the server nodes. In addition, information such as physical rack information, an installation position, etc. of each of the server nodes may be stored. Moreover, the virtual machine 420 among the server nodes may store information on the physical machine (the host machine) 410 in which the virtual machine 420 is implemented.

Hereinafter, the policy determination unit 330 including the load distribution policy determination unit 331 and the power management policy determination unit 333 will be described.

The load distribution policy determination unit 331 may be configured to determine the load distribution policy for each of the server nodes. For this, the load distribution policy determination unit 331 may use the information (the load distribution monitoring information and the server node monitoring information) of the monitoring unit 310 and the information of the server node information storage unit 320.

For example, the load distribution policy determination unit 331 may determine a weight for each of the server nodes using the load distribution policy of a weighted round robin (WRR) method. The load distribution policy determination unit 331 may allow processing much more service request load in a server node having a higher weight by allocating the higher weight as performance of the server node (particularly, the server node which is activated) included in the server cluster 400 increases, the amount of resource usage is decreased, and the power consumption is decreased.

Generally, since the virtual machine 420 is set to have a relatively low specification compared with the physical machine 410 and is a software node, service processing performance may be low compared with the physical machine 410, but the power consumption may be decreased compared with the physical machine 410 because additional power consumption does not occur. The load distribution policy determination unit 331 may determine a static weight for each of the server nodes by considering the above.

Further, the load distribution policy determination unit 331 may set the standard amount of resource and power usage for each of the server nodes, obtain a difference value between the standard amount of resource and power usage and the amount of resource and power usage of the server node, and use a dynamic weight obtained by subtracting the difference value. A positive value may be used when the amount of resource and power usage does not reach the standard amount of resource and power usage, and a negative value may be used when the amount of resource and power usage exceeds the standard amount of resource and power usage.

As such, the sum of the determined static weight and dynamic weight may be a total weight on the server node expressed by Equation 1.

$$\text{Total weight} = \text{static weight} + \text{dynamic weight} \quad \text{[Equation 1]}$$

In this case, the static weight may be obtained by Equation 2.

$$\text{Static weight} = (\alpha * \text{CPU coefficient}) + (\beta * \text{RAM size}) + (\gamma * \text{disk capacity}) + (\delta * \text{service coefficient}) + (\varepsilon * \text{machine coefficient}) + (\zeta * \text{power consumption coefficient}) \quad \text{[Equation 2]}$$

Here, $\alpha, \beta, \gamma, \delta, \varepsilon$, and $\zeta$ are proportional constants, each of a CPU coefficient, a service coefficient, a machine coefficient, and a power consumption coefficient may be different according to a CPU type, a service type, a machine type, and a rated power consumption of the server. For example, each of the CPU coefficient, the service coefficient, the machine coefficient, and the power consumption coefficient may have a value shown in Tables 1 to 4.

TABLE 1

| CPU type | CPU coefficient value |
|---|---|
| Dual Core Intel Xeon 7000 series | 1 |
| ARM processors X-Gene | 0.5 |
| Intel Celeron D Processor | 0.1 |

TABLE 2

| Service type | Service coefficient value |
|---|---|
| Web service | 1 |
| FTP service | 0.5 |
| Storage service | 0.1 |

TABLE 3

| Server type | Machine coefficient value |
| --- | --- |
| High performance machine | 1 |
| Low performance machine | 0.5 |
| Virtual machine | 0.1 |

TABLE 4

| Rated power consumption | Power consumption coefficient value |
| --- | --- |
| 100 Watt or less | 1 |
| 100 Watt or more and 150 Watt or less | 0.5 |
| 150 Watt or more | 0.1 |

The equation calculating the static weight may be a weighted sum method using one example, but the static weight may be calculated using another method such as a weighted max-min method, etc. The value may include an enumeration type value, and be an equation value proportional to a specific variable. Further, the static weight may be obtained using another static state information of the server node as well as the CPU type, the service type, the machine type, and the rated power consumption described above.

Meanwhile, the dynamic weight may be obtained using Equation 3.

$$\text{Dynamic weight} = \text{standard weight} + (\eta*(\text{standard amount of resource usage} - \text{amount of current resource usage})) + (\theta*(\text{standard amount of power usage} - \text{amount of current power usage}))$$ [Equation 3]

Here, $\eta$ and $\theta$ may be proportional constants. Further, as the standard amount of resource usage and the standard amount of power usage are the amount of resource usage and power usage of the server node capable of providing an optimum service, the standard amount of resource usage and the standard amount of power usage may be set for the entire server cluster 400, or be allocated for each server node or each node type.

Generally, the standard amount of resource usage of the virtual machine 420 may be set to be smaller than that of the physical machine 410. For example, since the virtual machine 420 does not consume power, $\theta$ may be set to have a value of 0, or values of the physical machine (the host machine) 410 of the virtual machine 420.

The equation calculating the dynamic weight may be the weighted sum method using one example, but the dynamic weight may be calculated using another method such as the weighted max-min method, etc.

While the static weight and the dynamic weight are absolute values, the static weight and the dynamic weight may be used by being normalized to be suitable for an allowable weight of the load distributor 200. In this case, the allowable weight may be predetermined according to the specification of the load distributor 200.

Values of the static weight and the dynamic weight may be set as a function of a time. Accordingly, a manager may add an experience of his/her own service to a load distribution policy by scheduling (setting) the weight with respect to the time. For example, the manager may determine the operation of the entire system by scheduling a value of the proportional constant, the standard weight, and the standard amount of resource usage so as to have different values according to the time.

The power management policy determination unit 333 may be configured to determine an active server node to be activated among the server nodes, and decrease the power consumption by converting the server nodes excluding the server node determined as the activate server node into an inactive state.

Hereinafter, an operation of the power management policy determination unit according to an embodiment of the present invention will be described in detail with reference to FIGS. 3 and 4.

Figure 3:
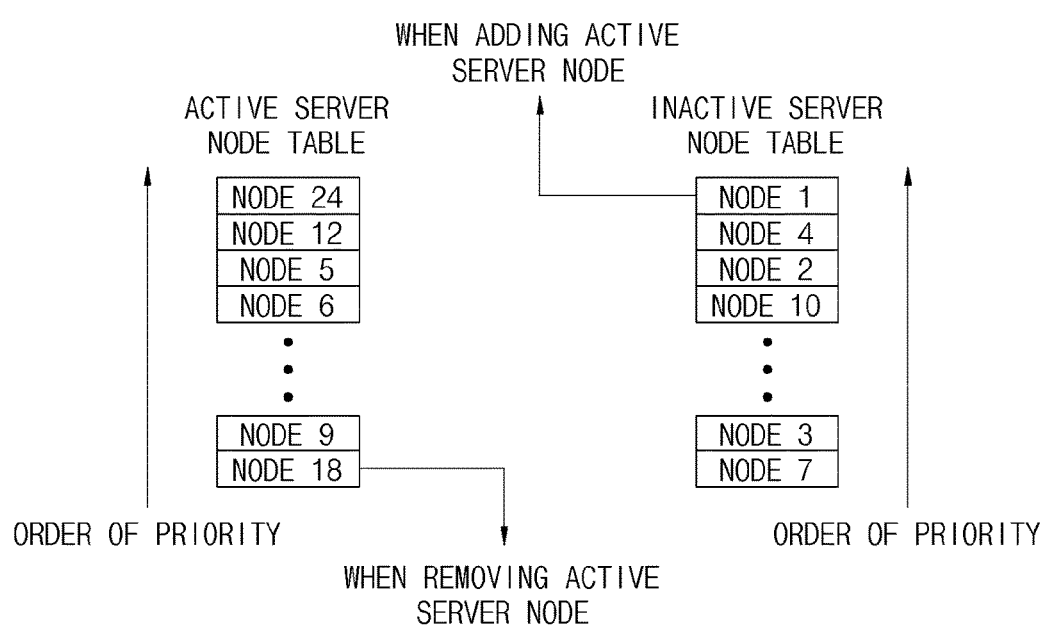
FIG. 3 is a diagram illustrating an active/inactive server node table according to an embodiment of the present invention.
Figure 4:
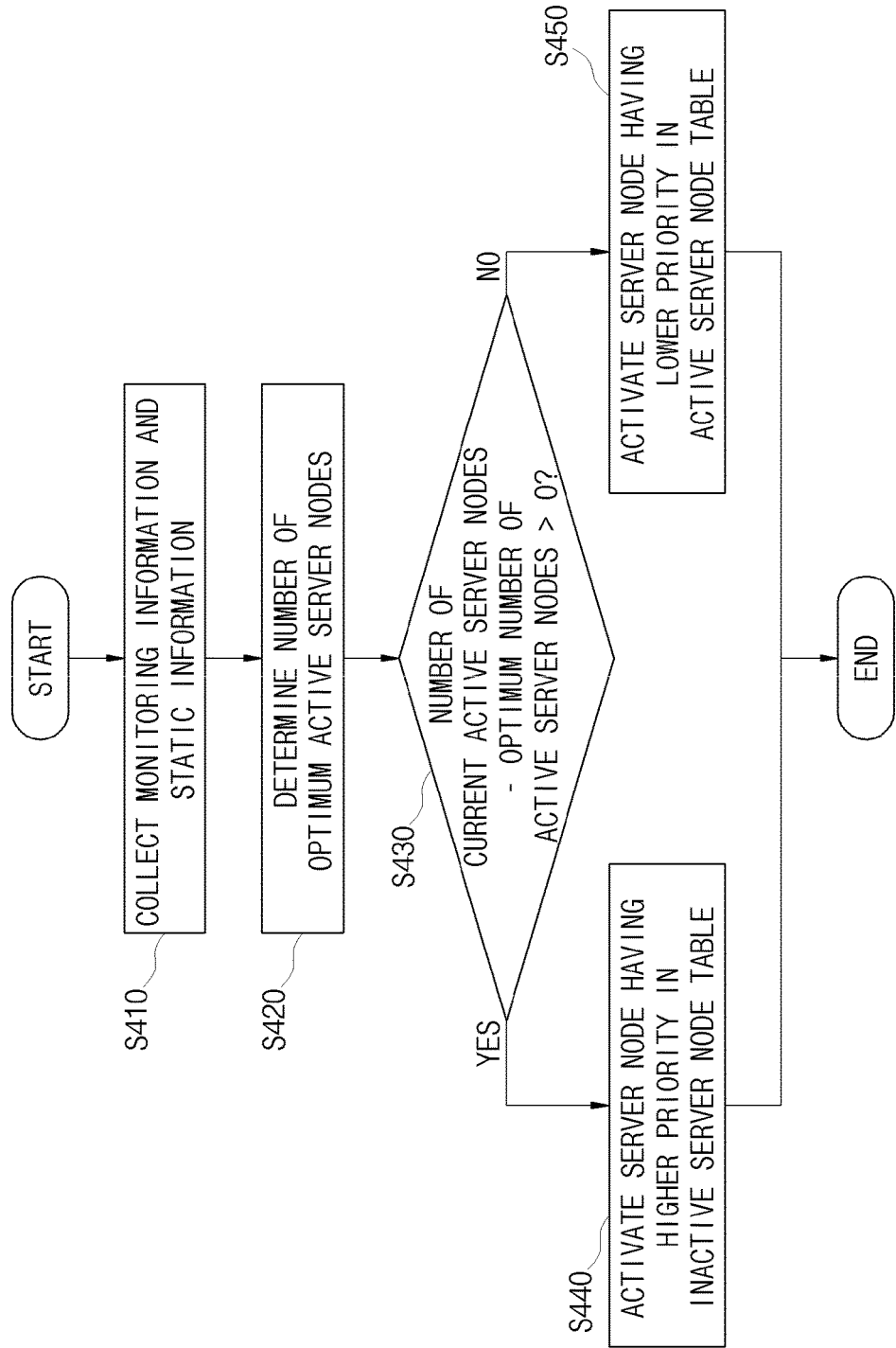
FIG. 4 is a flowchart for describing an operation of a power management policy determination unit according to an embodiment of the present invention.

FIG. 3 is a diagram exemplarily illustrating an active/inactive server node table according to an embodiment of the present invention, and FIG. 4 is a flowchart for describing an operation of a power management policy determination unit according to an embodiment of the present invention.

First, the power management policy determination unit 333 may collect information of the load distributor monitoring unit 311 the server node monitoring unit 313, and the server node information storage unit 320 S410.

The power management policy determination unit 333 may determine the number of optimal activate server nodes to be activated (S420). In this case, the power management policy determination unit 333 may determine the number of active server nodes with a predetermined time interval. For example, the power management policy determination unit 333 may set the number of server nodes which are currently needed, or recognize and determine a node state of a currently activated server node in proportion to the service request load.

The power management policy determination unit 333 may compare the number of current active server nodes and the number of optimal active server nodes in order to determine whether to add active server nodes to the server nodes which are currently being activated or convert a portion among the server nodes which are currently being activated into an inactive state (S430).

For example, the number of the active server nodes may be increased when a greater service request than the server node which is currently activated is able to process is received, and the number of the active server nodes may be decreased when a smaller service request than the server node which is currently activated is able to process is received. Further, the number of active server nodes may be increased when the amount of current resource usage is too great (the amount of current resource usage>the amount of predetermined resource usage), and the number of active server nodes may be decreased when the amount of current resource usage is equal to or less than the amount of predetermined resource usage (the amount of current resource usage≤the amount of predetermined resource usage).

In order to activate or deactivate each of the server nodes, the power management policy determination unit 333 may manage two tables. Here, one of the two tables may be an inactive server node table, and the other may be an active server node table. An order of priority for each of the server nodes stored in the active server node table and the inactive server node table may be set and managed. Here, the order of priority may be set with various methods. For example, the order of priority may be determined by the method used when obtaining the static weight of the load distribution policy.

The power management policy determination unit 333 may activate a server node having a higher priority in the inactive server node table when the number of current active server nodes is smaller than the number of optimal active server nodes (S440). In order to increase the number of the active server nodes by the number of server nodes (the number of the activated server nodes) which is determined, the server nodes (from node 3 to node 1) having a higher priority in the inactive server node table may be activated. After this, the server nodes (node 1→node 4→ . . . ) which are activated in order of having the higher priority in the inactive server node table may be moved to the active server node table according to the number of the server nodes converted from the inactive state to the active state.

When the number of current active server nodes is greater than the number of optimal active server nodes, the power management policy determination unit 333 may deactivate a server node having a lower priority in the active server node table (S450). In order to decrease the number of the active server nodes, a server node (node 18 in FIG. 3) having the lowest priority in the active server node table may be deactivated. After this, server nodes (node 18→node 9→ . . . ) which are deactivated in order of having a lower priority may be moved to the inactive server node table according to the number of the server nodes converted from the active state to the inactive state.

Meanwhile, the order of priority on each of the server nodes may be determined by using the static weight and the dynamic weight using in the load distribution policy, and an order of priority additionally considering time activated may be added. The order of priority additionally considering time activated may be expressed as Equation 4.

Entire priority determination coefficient=(static weight+dynamic weight)*exp(−(active time))  [Equation 4]

As the above Equation, since a priority determination coefficient decreases as the active time is increased, a deactivation probability may be increased as a server node has a long active time.

Further, the priority determination coefficient may be set as a function of the time like the weight of the load distributor 200. That is, the manager may add the experience of his/her own service to the load distribution policy by scheduling the weight with respect to the time. For example, an operation of the entire system may be determined by scheduling the value of a proportional constant, a standard weight, and the standard amount of resource usage so as to have different values according to the time.

Meanwhile, there may be a case in which the manager inputs two states of an active state and an inactive state for each time as shown in Table 5 rather than a case in which the manager directly inputs the order of priority which is generally complex.

TABLE 5

| Server node | Time period | Power state |
| --- | --- | --- |
| Node 1 | 0~9 o'clock | Inactive |
|  | 9~20 o'clock | Active |
|  | 20~24 o'clock | Inactive |
| Node 2 | 0~23 o'clock | Active |
|  | 23~24 o'clock | Inactive |

The scheduling may be easily changed through the order of priority. For example, in Table 5, both the static weight and the dynamic weight may be allocated to have 0 in the inactive state, and both the static weight and the dynamic weight may be allocated to have a maximum value in the active state.

However, in Table 5, when the manager activates only the virtual machine 420 in a state in which the physical machine (the host machine) 410 which is the host of the virtual machine 420 is not activated, the host machine may be automatically activated. On the contrary, when the virtual machine 420 is not deactivated and only the host machine is deactivated, the host machine may not be deactivated until the virtual machine 420 is deactivated. That is, the power state of the virtual machine 420 may be preferentially operated compared with the power state of the host machine.

For example, when the power state of the virtual machine 420 is scheduled by the manager at a specific time, an example of an operation in which the power state of the host machine is controlled according to the power state allocated to the host machine of a corresponding virtual machine 420 at the specific time may be summarized as shown in Table 6.

TABLE 6

| Virtual machine allocation power state | Host machine allocation power state | Host machine power state control | Virtual machine power state control |
| --- | --- | --- | --- |
| Active | Active | No operation (maintain active state) | Convert to active |
| Active | Inactive | Convert to active | Convert to active after converting host machine to active |
| Inactive | Active | No operation (maintain active state) | Convert to inactive |
| Inactive | Inactive | Convert to inactive after converting virtual machine to inactive | Convert to inactive |

Further, when the plurality of virtual machines 420 operates in a single host machine, the activation of the virtual machine 420 may be preferentially set. For example, when a virtual machine 1 and a virtual machine 2 in the same physical machine (the host machine) are set to the active state and the inactive state at a specific time, respectively, the active state may have the priority, and thus the host machine may be maintained in the active state. After this, when both the virtual machine 1 and the virtual machine 2 are deactivated, the host machine may be converted into the inactive state.

The load distributor controller 341 may transmit the load distribution policy determined by the load distribution policy determination unit 331 to the load distributor 200, and control on the activated server node or the deactivated server node according to the load distributor 200 so that the load is distributed to the activated server nodes. For example, by the WRR method, the load distributor controller 341 may set the load distributor 200 using a changed weight. Further, the load distributor controller 341 may control an operation of the load distributor 200 power management policy determined by the power management policy determination unit 333.

The power management controller 343 may execute the power management policy determined by the power management policy determination unit 333 through communication with the server nodes. For example, the power management controller 343 may convert the power state of the server node activated by the power management policy into the active state, and activate a service application based on the service request. Further, the power state of the deactivated server node may be converted into the inactive state, and thus power consumption may be decreased.

The policy storage unit 350 may store the load distribution policy and the power management policy determined by the load distribution policy determination unit 331 and the power management policy determination unit 333, and may allow the load distribution policy and the power management policy to be read and used after storage.

Accordingly, according to an embodiment of the present invention, by performing the load distribution and the power management of the server cluster for cloud computing including the virtualized virtual machine server node as well as the actual physical server, the performance of a desired service of the virtualized server cloud may be maintained, the power consumption may be decreased inefficiency occurring by not considering the conventional virtual machine may be overcome, and satisfactory service performance and the decrease of the power consumption may be obtained. Further, according to an embodiment of the present invention, when determining the weight of the load distribution and the order of priority of power management, since a user sets the standard amount of usage and schedules the standard amount of usage according to time, an experience of the user may also be reflected.

Figure 5:
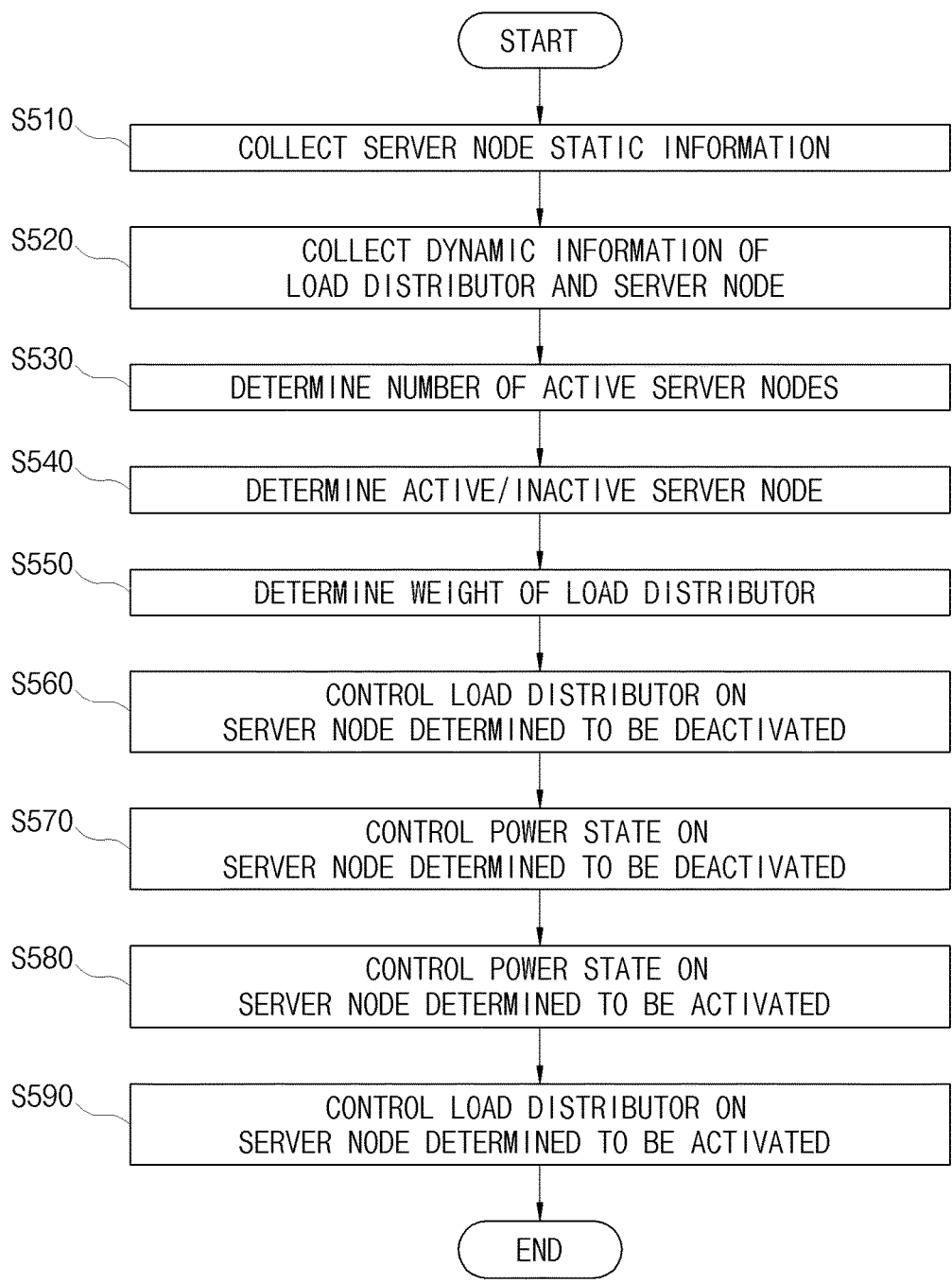
FIG. 5 is a flowchart for describing a method of distributing a load and managing power of a virtual server cluster according to an embodiment of the present invention.

FIG. 5 is a flowchart for describing a method of distributing a load and managing power of a virtual server cluster according to an embodiment of the present invention.

Hereinafter, unless specially described, it may be assumed that the method of distributing a load and managing power of a virtual server cluster according to an embodiment of the present invention is operated by the load distribution/power management device 300.

First, additional information (static state information) having a static information type of each of the server nodes included in the server cluster 400 may be collected (S510). Here, the additional information having the static information type may include the vendor or the rated power consumption, etc. of each of the server nodes. In addition, the additional information having the static information type may be physical rack information, an installation location, etc. of each of the server nodes. Further, in the virtual machine 420 of the server nodes, information on the host machine (the physical machine 410) in which the virtual machine 420 is implemented may be collected.

Further, dynamic state information of the load distributor 200 and the server cluster 400 may also be collected (S520). For example, a request connection state including the CPS or the amount of packets on the virtual server of the load distributor 200 may be recognized, information on the server nodes attached (connected) to and distributed by the virtual server of the load distributor 200 may also be monitored, and the dynamic state information of the load distributor 200 and the server cluster 400 may be collected.

The number of optimal active server nodes to be activated may be determined (S530). In this case, the number of active server nodes may be determined with a predetermined time interval. For example, the number of server nodes which are currently needed may be set in proportion to the service request load, and the node state of the server node which is currently activated may be recognized and determined.

For example, the number of the active server nodes may be increased when a greater service request than the server node which is currently activated is able to process is received, and the number of the active server nodes may be decreased when a smaller service request than the server node which is currently activated is able to process is received. Further, the number of activation service nodes may be increased when the amount of current resource usage is too great (the amount of current resource usage>the amount of predetermined resource usage), and the number of activation service nodes may be decreased when the amount of current resource usage is equal to or smaller than the amount of predetermined resource usage (the amount of current resource usage≤the amount of predetermined resource usage).

Further, whether to add an active server node to the server nodes which are currently activated or convert a state of a portion of the server nodes which are currently activated into the inactive state may be determined by comparing the number of current server nodes and the number of optimal active server nodes (S540). In order to activate or deactivate each of the server nodes, the inactive server node table and the active server node table may be referenced. The order of priority may be set and managed for each of the server nodes stored in the active server node table and the inactive server node table. Here, the order of priority may be set with various methods. For example, the order of priority may be determined by the method used when obtaining the static weight or the dynamic weight of the load distribution policy.

When the number of server nodes which are currently activated is smaller than the number of optimal active server nodes, a server node having a higher priority in the inactive server node table may be determined to be activated. In this case, server nodes (in FIG. 3 node 1→node 4→ . . . ) may be converted into the active server node in order of having a higher priority in the inactive server node table.

A server node having a lower priority in the active server node table may be determined to be deactivated when the number of server nodes which are currently activated is greater than the number of optimal active server nodes. In this case, in order to decrease the number of the active server nodes, server nodes (in FIG. 3, node 18→node 9→ . . . ) may be converted into the inactive server node in order of having a lower priority in the active server node table.

After this, a weight of the load distributor may be determined (S550). For example, the weight on each of the server nodes may be determined in a load distribution policy of the WRR method. As the performance of the server node is increased, the amount of resource usage is decreased, and as the power consumption is decreased, a higher weight may be allocated, and thus much more service request load may be processed in the server node having the higher weight.

The total weight may be the sum of the static weight and the dynamic weight (Equation 1), the static weight may be obtained using Equation 2, and the dynamic weight may be obtained using Equation 3.

Generally, since the virtual machine 420 is set to have a relatively low specification compared with the physical machine 410 and is a S/W node, the service processing performance may be low compared with the physical machine 410, but the power consumption may be decreased compared with the physical machine 410 because power is not additionally consumed. The static weight on each of the server nodes may be determined by considering this.

Further, a standard amount of resource and power usage of each of the server nodes may be set, a difference value between the amount of resource and power usage of the server node and the standard amount of resource and power usage may be obtained, and the dynamic weight obtained by subtracting the difference value may be used. A positive value may be used when the amount of resource and power usage does not reach the standard amount of resource and power usage, and a negative value may be used when the amount of resource and power usage exceeds the standard amount of resource and power usage.

The load distributor 200 may be controlled so that the load is not distributed to a server node determined to be deactivated according to the load distribution policy (S560). For example, when a server node which is in the active state is determined to be converted into the inactive state according to the load distribution policy, the load distributor 200 may be controlled so that the load on the service request is not distributed to the inactive server node.

Further, a power state for the server node determined to be deactivated may be controlled according to the power management policy (S570). For example, when the server node which is in the active state is determined to be converted into the inactive state, the power may not be provided to the server node determined to be converted from the active state to the inactive state, the power state of the server node may be converted into the inactive state, and thus the power consumption may be decreased.

Moreover, a power state for the server node determined to be activated may be controlled according to the power management policy (S580). For example, when a server node which is in the inactive state is determined to be converted into the activate state, the power may be provided to the server node determined to be converted from the inactive state to the active state, and the power state of the server node may be converted into the active state. When the server node in which the conversion into the active state is determined is the virtual machine 420, the power may be managed so that the physical machine 410 of the virtual machine 420 which is to be activated is also activated.

In addition, the load distributor 200 may be controlled so that the load is distributed to the activated server node using the load distribution policy (S590). For example, when the server node which is in the inactive state is determined to be converted into the inactive state according to the load distribution policy, the load distributor 200 may be controlled so that the load on the service request is distributed to the active server node. In this case, the service request load may be controlled to be distributed properly according to the weight of the active server node.

Accordingly, according to an embodiment of the present invention, by performing the load distribution and the power management of the server cluster for cloud computing including the virtualized virtual machine node as well as the actual physical server, the performance of a desired service of the virtualized server cloud may be maintained, the power consumption may be decreased, inefficiency occurring by not considering the conventional virtual machine 420 may be overcome, and satisfactory service performance and the decrease of the power consumption may be obtained. Further, according to an embodiment of the present invention, when determining the weight of the load distribution and the order of priority of power management, since the user sets the standard amount of usage and schedules the standard amount of usage according to time, the experience of the user may also be reflected.

Figure 6:
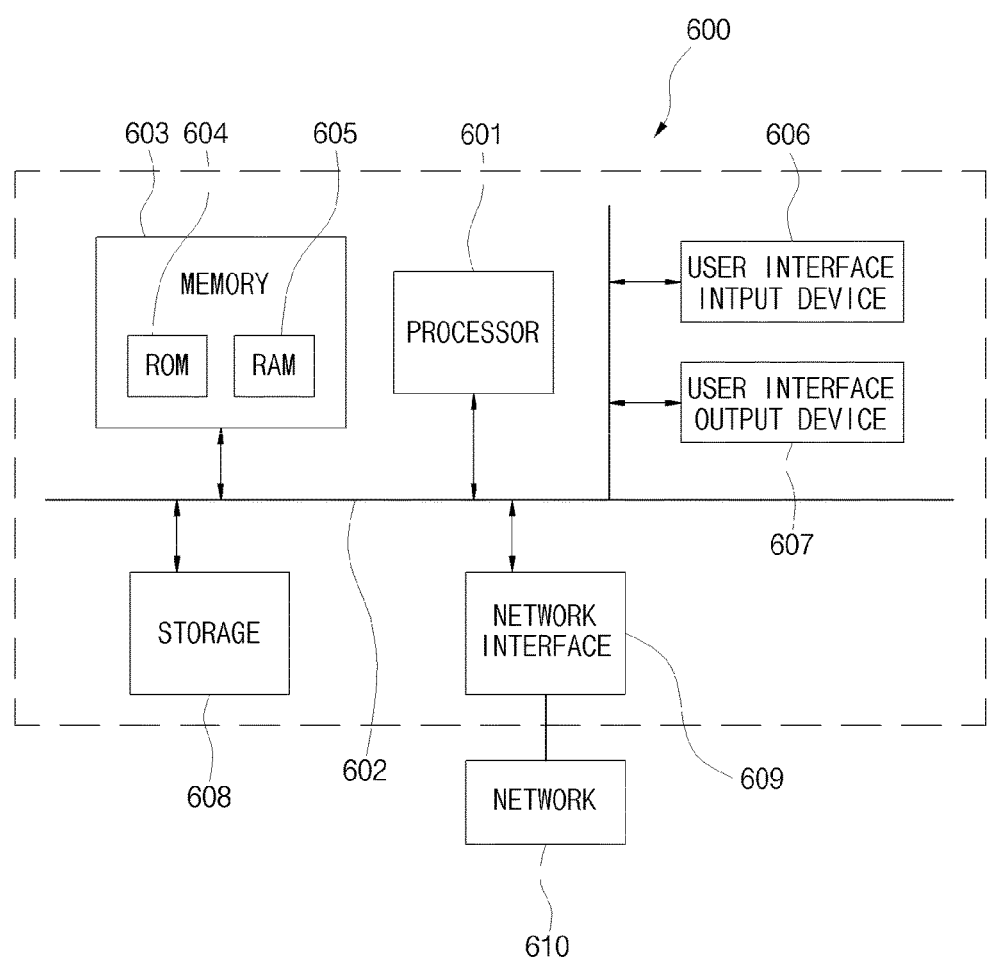
FIG. 6 is a block diagram illustrating a computer system for the present invention.

An embodiment of the present invention may be implemented in a computer system, e.g., as a computer readable medium. As shown in FIG. 6, a computer system 600 may include one or more of a processor 601, a memory 603, a user input device 606, a user output device 607, and a storage 608, each of which communicates through a bus 602. The computer system 600 may also include a network interface 609 that is coupled to a network 610. The processor 601 may be a central processing unit (CPU) or a semiconductor device that executes processing instructions stored in the memory 603 and/or the storage 608. The memory 603 and the storage 608 may include various forms of volatile or non-volatile storage media. For example, the memory may include a read-only memory (ROM) 604 and a random access memory (RAM) 605.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

The above-described embodiments of the present invention are merely examples, and it should be apparent to those skilled in the art that various modifications can be made to the above-described embodiments of the present invention without departing from the spirit or the scope of the invention. Accordingly, it should be understood that the embodiments of the present invention are not intended to limit the scope of the invention but to describe the invention in all aspects. For example, each component described in a single form may be implemented in a distributed form, and similarly, components described in a distributed form may be implemented in a combined form. The scope of the present invention is defined by the appended claims, and it is intended that the present invention covers all such modifications provided they come within the scope of the appended claims and their equivalents.

What is claimed is:

1. A device for distributing a load and managing power, comprising:
   a monitoring unit configured to monitor a load distribution condition on server nodes included in a server cluster and a dynamic state of each of the server nodes;
   a server node information storage unit configured to store static state information of each of the server nodes;
   a policy determination unit configured to determine a load distribution policy and a power management policy for each of the server nodes using information monitored by the monitoring unit and the static state information stored in the server node information storage unit; and
   a controller configured to control conversion of the server nodes into an active state or an inactive state according to the power management policy, and distribution of a load of a service request requested by a service client to activated server nodes according to the load distribution policy;
   wherein the power management policy determination unit manages an active server node table which sets and manages an order of priority of the server nodes which are activated, and an inactive server node table which sets and manages an order of priority of server nodes which are deactivated; and
   wherein the power management policy determination unit determines a policy so as to convert the server nodes into the active state in order of having a higher priority in the inactive server node table, and determines a policy so as to convert the server nodes into the inactive state in order of having a lower priority in the active server node table.

2. The device for distributing the load and managing the power of claim 1, wherein the monitoring unit comprises:
   a load distributor monitoring unit configured to monitor a request connection state including at least one of connections per second (CPS) or the amount of packets for the load distributor connected to the server cluster; and
   a server node monitoring unit configured to monitor at least one dynamic state among the amount of resource usage, service information and provision state, and a power state of each of the server nodes.

3. The device for distributing the load and managing the power of claim 2, wherein the static state information is additional information having a static information type including at least one among a vendor, a rated power consumption, physical rack information, and an installation location of each of the server nodes.

4. The device for distributing the load and managing the power of claim 3, wherein the policy determination unit comprises:
a load distribution policy determination unit configured to determine a static weight and a dynamic weight for each of the server nodes using the static state information and the dynamic state information; and
a power management policy determination unit configured to determine a server node which is to be activated among the server nodes.

5. The device for distributing the load and managing the power of claim 4, wherein the load distribution policy determination unit schedules at least one among a value of a proportional constant, a standard weight, and a standard amount of resource usage in units of time according to a manipulation of a user, and reflects the schedule in the load distribution policy.

6. The device for distributing the load and managing the power of claim 5, wherein the power management policy determination unit determines a number of optimal active server nodes in proportion to the service request, and determines whether to convert the server nodes into the active state or the inactive state according to the number of optimal active server nodes.

7. The device for distributing the load and managing the power of claim 1, wherein the controller comprises:
a load distributor controller configured to control the load distributor to consider a weight of each of the active server nodes so that the load of the service request is distributed to the active server nodes; and
a power management controller configured to manage a power state of each of the server nodes to be the active state or the inactive state.

8. The device for distributing the load and managing the power of claim 7, wherein, when a power state of a virtual machine among the server nodes is converted into the active state or the inactive state, the power management controller converts the virtual machine into the active state after converting a physical machine, which is a host of the virtual machine, into the active state, and converts the physical machine into the inactive state after converting the virtual machine into the inactive state.

9. A method of distributing a load and managing power, comprising:
monitoring a load distribution condition on server nodes included in a server cluster and a dynamic state of each of the server nodes;
storing static state information of each of the server nodes;
determining a load distribution policy and a power management policy for each of the server nodes using information monitored by the monitoring unit and the static state information stored in the server node information storage unit; and
controlling conversion of each of the server nodes into an active state or an inactive state according to the power management policy, and distribution of a load of a service request requested by a service client to active server nodes according to the load distribution policy;

wherein the determining of the load distribution policy and the power management policy further includes
managing an active server node table which sets and manages an order of priority of the server nodes which are activated, and an inactive server node table which sets and manages an order of priority of server nodes which are deactivated,
determining a policy so as to convert the server nodes into the active state in order of having a higher priority in the inactive server node table, and
determining a policy so as to convert the server nodes into the inactive state in order of having a lower priority in the active server node table.

10. The method of distributing a load and managing power of claim 9, wherein the monitoring of the load distribution condition on the server nodes included in the server cluster and the dynamic state of each of the server nodes, comprises:
monitoring a request connection state including at least one of connections per second (CPS) or the amount of packets for a load distributor connected to the server cluster; and
monitoring at least one dynamic state among the amount of resource usage, service information and provision state, and a power state of each of the server nodes.

11. The method of distributing a load and managing power of claim 10, wherein the static state information is additional information having a static information type including at least one among a vendor, a rated power consumption, physical rack information, and an installation location of each of the server nodes.

12. The method of distributing a load and managing power of claim 11, wherein the determining of the load distribution policy and the power management policy comprises:
determining a static weight and a dynamic weight for each of the server nodes using the static state information and the dynamic state information; and
determining a server node which is to be activated among the server nodes.

13. The method of distributing a load and managing power of claim 12, wherein the determining of the load distribution policy and the power management policy schedules at least one among a value of a proportional constant, a standard weight, and a standard amount of resource usage in units of time according to a manipulation of a user, and reflects the schedule in the load distribution policy.

14. The method of distributing a load and managing power of claim 13, wherein the determining of the load distribution policy and the power management policy determines a number of optimal active server nodes in proportion to the service request, and determines whether to convert the server nodes into the active state or the inactive state according to the number of optimal active server nodes.

15. The method of distributing a load and managing power of claim 9, wherein the controlling the conversion of each of the server nodes into the active state or the inactive state according to the power management policy and the distribution of the load of the service request requested by the service client to the activated server nodes according to the load distribution policy, comprises:
controlling the load distributor to consider a weight of each of the active server nodes so that the load of the service request is distributed to the active server nodes; and
managing a power state of each of the server nodes to be the active state or the inactive state.

16. The method of distributing a load and managing power of claim 15, wherein, when a power state of a virtual machine among the server nodes is converted into the active state or the inactive state, the virtual machine is converted into the active state after converting a physical machine, which is a host of the virtual machine, into the active state, and the physical machine is converted into the inactive state after converting the virtual machine into the inactive state.

* * * * *